United States Patent [19]

Sakagami et al.

[11] Patent Number: 4,982,391
[45] Date of Patent: Jan. 1, 1991

[54] METHOD AND APPARATUS FOR ACCESSING A DESIRED TRACK OF A RECORDING MEDIUM DURING A STOPPED STATE OF RECORDING OR REPRODUCTION

[75] Inventors: Wataru Sakagami, Yokohama; Shigeyuki Taniwa, Yokohama; Kiyonobu Endo, Yokohama; Hideki Hosoya, Kawasaki, all of Japan

[73] Assignee: Canon Kabushiki Kaisha, Tokyo, Japan

[21] Appl. No.: 155,276

[22] Filed: Feb. 12, 1988

[30] Foreign Application Priority Data

Feb. 20, 1987 [JP] Japan ................................ 62-35895
Feb. 20, 1987 [JP] Japan ................................ 62-35896
Feb. 20, 1987 [JP] Japan ................................ 62-35897
Jul. 23, 1987 [JP] Japan ................................ 62-182316

[51] Int. Cl.$^5$ .................... G06K 7/01; G11B 21/08
[52] U.S. Cl. ........................... 369/32; 369/47; 369/58; 235/454; 235/476
[58] Field of Search .............. 369/30, 32, 47, 48, 369/54, 58, 59, 44; 235/454, 456, 475, 476

[56] References Cited

U.S. PATENT DOCUMENTS

| | | | |
|---|---|---|---|
| 3,351,948 | 11/1967 | Bonn | 346/76 L |
| 4,615,023 | 9/1986 | Inada et al. | 369/32 |
| 4,644,514 | 2/1987 | Ohshima et al. | 369/32 |
| 4,733,386 | 3/1988 | Shimoi | 369/59 |
| 4,787,075 | 11/1988 | Matsuoka et al. | 235/454 |
| 4,811,316 | 3/1989 | Hosoya | 369/32 |
| 4,829,168 | 5/1989 | Nakahara | 235/489 |
| 4,872,154 | 10/1989 | Sakagami et al. | 369/54 |

FOREIGN PATENT DOCUMENTS

| | | | |
|---|---|---|---|
| 0176185 | 4/1986 | European Pat. Off. | 369/32 |
| 0200434 | 12/1986 | European Pat. Off. | |
| 3546067 | 7/1986 | Fed. Rep. of Germany | |
| 58-130471 | 8/1983 | Japan | |
| 60-223037 | 11/1985 | Japan | |
| 61-243994 | 10/1986 | Japan | |
| 61-273748 | 12/1986 | Japan | |
| 2161632 | 1/1986 | United Kingdom | |
| 2172138 | 9/1986 | United Kingdom | |
| 2174531 | 11/1986 | United Kingdom | |

Primary Examiner—Stuart S. Levy
Assistant Examiner—Robert A. Weinhardt
Attorney, Agent, or Firm—Fitzpatrick, Cella, Harper & Scinto

[57] ABSTRACT

A method and apparatus for accessing a track in a recording medium during a stopped state of recording or reproduction. The method includes accessing a recording and/or reproducing device to a desired track of a plurality of tracks on the information recording medium. The recording and/or reproducing device and the recording medium are not relatively moved in a longitudinal direction of the tracks, while the recording and/or reproducing device is moved relative to the recording medium in a direction which crosses the tracks. The apparatus for recording and/or reproducing information includes a device for recording information on and/or reproducing information from a recording medium having a plurality of parallel tracks, a first driving device for moving the recording medium relative to the recording and/or reproducing device in a longitudinal direction of the tracks, a second driving device for moving the recording and/or reproducing device relative to the recording medium in a direction crossing the tracks, and a device for controlling the first driving device for disabling the first driving device when the second driving device is operated.

18 Claims, 17 Drawing Sheets

RECORD
CONTROL
SIGNAL

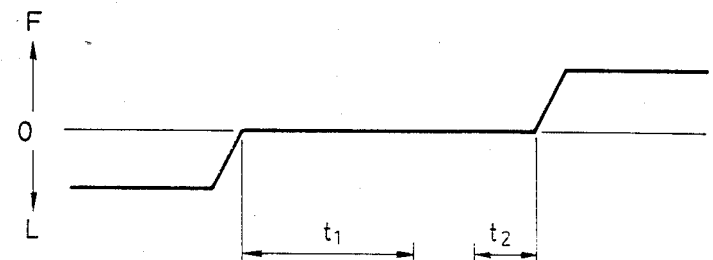
FIG. 32A
FIG. 32B
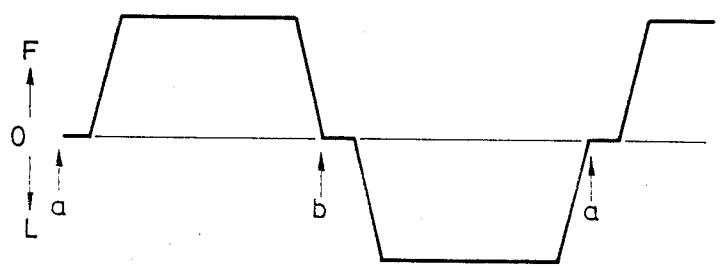
FIG. 33

METHOD AND APPARATUS FOR ACCESSING A DESIRED TRACK OF A RECORDING MEDIUM DURING A STOPPED STATE OF RECORDING OR REPRODUCTION

BACKGROUND OF THE INVENTION:

1. Field of the Invention

The present invention relates to an apparatus for recording and/or reproducing information ion/from a recording medium and a method of accessing a recording and/or reproducing means in the apparatus to a desired track.

2. Related Background Art

Various conventional recording media such as disk-, card-, and tape-like media are known and used for recording or reproducing information with light. These optical information recording media include write/read type media and read-only media.

Information can be recorded in a recordable medium as follows. A modulated light beam spot is used to scan information tracks, and information is recorded as information bit arrays which can be optically detected.

Information can be reproduced from the recording medium as follows. A light beam spot having power which does not allow recording on the medium scans the information bit array of the desired information track, and light reflected by or transmitted through the medium is detected, thereby reproducing information.

A so-called optical head is used to emit the light beam spot on the recording medium described above and to detect light reflected by or transmitted through the recording medium. The optical head is moved relative to the recording medium in an information track direction or a direction perpendicular thereto. Relative movement of the optical head allows information track scanning with the light beam spot.

Of the conventional optical information recording media, a card-like optical information recording medium (to be referred to as an optical card hereinafter) is most promising because it can serve as a compact, lightweight, portable, large-capacity information recording medium. Apparatuses for recording/reproducing information in/from such an optical card are described in U.S. Pat. No. 4,787,075 and U.S. patent application Ser. No. 812,995 (filed on Dec. 24, 1985).

FIG. 1 is a plan view of an optical card which allows additional writing, and FIG. 2 is an enlarged view of its main part.

Referring to FIG. 1, a large number of information tracks 2 are formed on an information recording surface of an optical card 1 in the directed indicated by arrows L and F (the LP direction). A home position 3 is determined on the information recording surface of the optical card 1 and serves as a reference position for accessing the information tracks 2. The information tracks 2 are arranged in an order of 2-1, 2-2, 2-3,. . . from the home position 3. The information tracks include tracks in which information has already been recorded (to be referred to as recorded information tracks, hereinafter) and tracks in which information is not recorded (to be referred to as nonrecorded information tracks, hereinafter). Information can be recorded in the nonrecorded information tracks at any time.

As shown in FIG. 2, tracking tracks (e.g., 5-1, 5-2, and 5-3) are formed between the adjacent tracks 2 (e.g., 2-1 and 2-2). The tracking tracks are utilized as a guide for auto tracking (AT) so as to prevent a light beam spot in the recording and/or reproducing mode from deviating from a predetermined information track during scanning.

In the information recording or reproducing mode, the light beam spot is always located at the home position 3 and is accessed from this position to a target information track. This track access is performed by moving the optical head in a direction perpendicular to the information tracks and at the same time, moving some (e.g., an objective lens) of the optical elements in the optical head in the direction perpendicular to the information tracks. The latter operation is called a kick operation.

The kick operation is performed as follows. Pulses (kick pulses) are applied to an actuator to move the objective lens in the direction perpendicular to the information tracks after the AT control loop is opened. After a predetermined period of time has passed, pulses (brake pulses) having a polarity opposite to the kick pulse are applied to the actuator to brake the objective lens such that the speed of the light beam spot is zero when the spot reaches the information track adjacent to the target information track. This can be achieved by properly selecting the magnitudes and widths of the kick and brake pulses. At this time, the AT control loop is closed to guide the light beam spot to the target information track.

Whether the current track is the target information track or not is discriminated by the current information track number. As shown in FIG. 2, track number data are preformatted in an area 6 located on a line extending from the tracking tracks. The optical head is reciprocally moved relative to the optical head in the LF direction to read the number area. The position of the light beam spot can be detected on the basis of the read results. In another system, a track number is recorded in each information track every time information is recorded in the information track. The optical card is reciprocally moved relative to the optical head in the LF direction. The track number is extracted on the basis of the read result to detect the position of the light beam spot.

In the apparatus described above, the optical card is continuously moved in the LF direction to detect the track number, thereby accessing the target track. According to this method, however, the optical head cannot often be moved accurately to the target track by vibrations generated upon card driving. In addition, if a loading error of the optical card in the apparatus occurs, e.g., if an inclination (skew) of the track is present with respect to the moving direction of the optical card, the track positions are changed during access. Therefore, the final position of the light spot is undesirably deviated from the target track, and access time is prolonged.

SUMMARY OF THE INVENTION

It is an object of the present invention to solve the above technical problems and to provide a method of performing accurate track access within a short period of time and an apparatus therefor.

The above object of the present invention can be achieved such that the recording medium is maintained in a stopped position in the track longitudinal direction during access.

BRIEF DESCRIPTION OF THE DRAWINGS

FIG. 32A is a chart showing a change in moving rate of the light beam spot in the apparatus shown in FIG. 28;

FIG. 32B is a chart showing kick pulses;

FIG. 33 is a chart showing a change in moving rate of the light beam spot in the apparatus shown in FIG. 28 in the reproducing mode.

DETAILED DESCRIPTION OF THE PREFERRED EMBODIMENTS

Preferred embodiments of the present invention will be described in detail with reference to the accompanying drawings.

Figure 1:
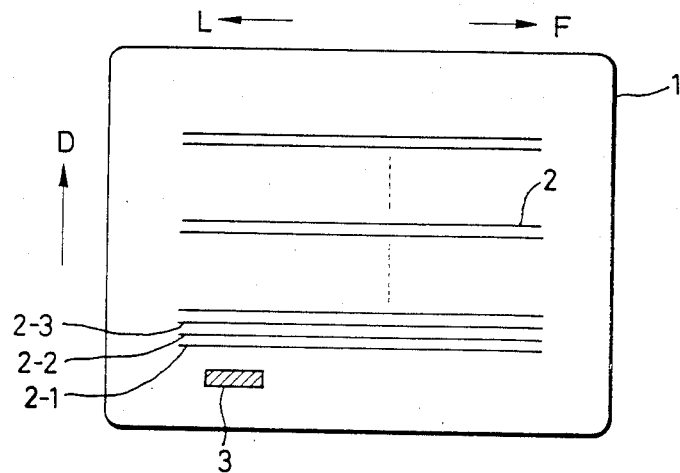
FIG. 1 is a plan view of a conventional optical card which allows additional writing.
Figure 2:
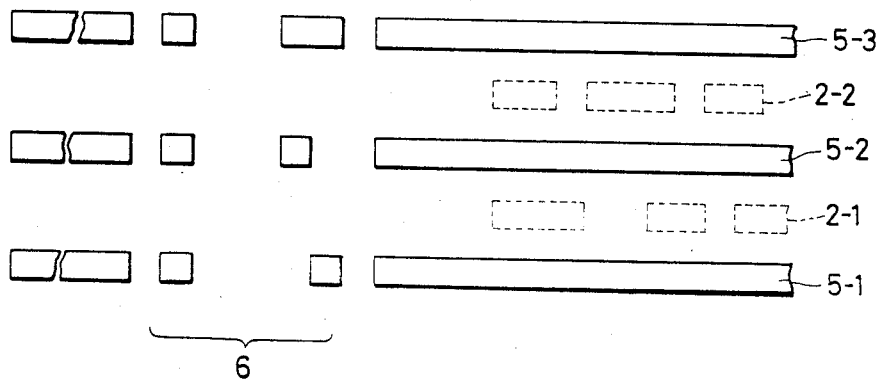
FIG. 2 is an enlarged view showing part of the card shown in FIG. 1.
Figure 3:
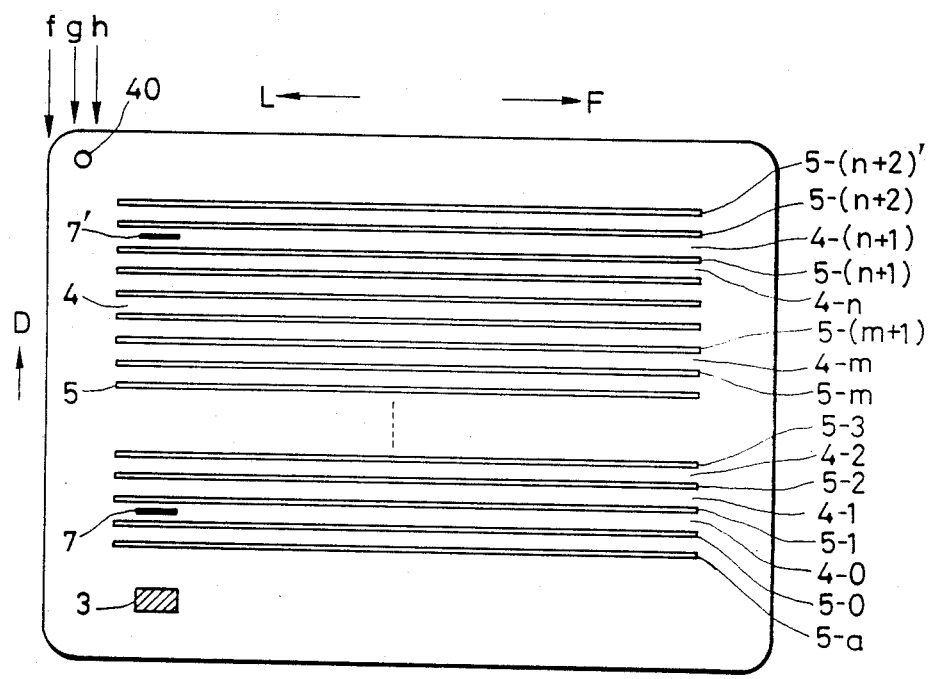
FIG. 3 is a plan view of an optical card used in a method of the present invention.

FIG. 3 is a plan view showing an optical card used in the present invention.

Referring to FIG. 3, a large number of parallel information tracks 4 are formed on the information recording surface of an optical card 1 in the LF direction. A home position 3 is determined on the information recording surface and serves as a reference position for accessing the information tracks 4. The home position may be an imaginary position. The information tracks 4 are arranged in an order of 4-0, 4-1, 4-2, 4-3, . . . 4-(n+1) from the home position 3. Tracking tracks 5-0, 5-1, 5-2, 5-3, . . . 5-(n+1) are arranged for these information tracks. A guard tracking track 5-a is formed adjacent to the tracking track 5-0 at a position opposite to the tracking track 5-1. Guard tracking tracks 5-(n+2) and 5-(n+2)' are formed adjacent to the tracking track 5-(n+1) at positions opposite to the tracking track 5-n. The number of guard tracks can be arbitrarily determined.

Figure 4:
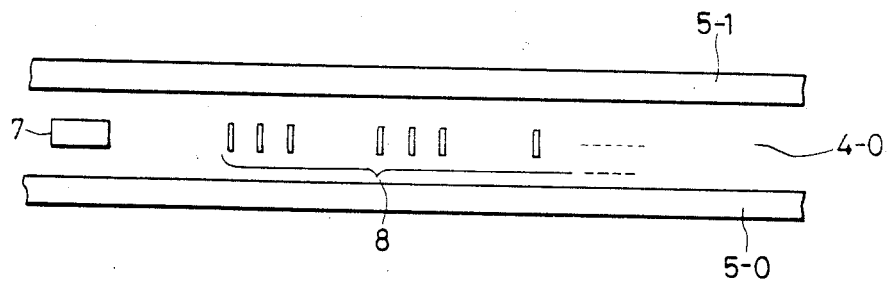
FIG. 4 is an enlarged view showing part of the card shown in FIG. 3.

FIG. 4 is an enlarged view showing part of the optical card shown in FIG. 3.

As shown in FIG. 4, a G mark 7 is prerecorded in the information track 4-0. The G mark represents that the corresponding information track is the reference track. That is, the information track 4-0 is the reference track. A recording medium discrimination pattern 8 is recorded in the reference track. The recording medium discrimination pattern represents the type of optical card and consists of optical card information associated with the modem scheme, the data capacity per information track, the total number of tracks, and the like. The G mark 7 or the recording medium discrimination pattern 8 is preformatted in the same manner as the tracking tracks or may be formed by recording with a light beam spot.

Referring to FIG. 3, of the information tracks 4-1 to 4-n, information has already been recorded in the information tracks 4-1 to 4-m. These information tracks are thus the recorded tracks. Information is not recorded in the information tracks 4-(m+1) to 4-n. These information tracks are, thus, the nonrecorded information tracks.

As shown in FIG. 3, a G mark 7' is recorded in the information track 4-(n+1) and this track serves as a reference track. This reference track serves as a directory reference. Directory information of the recorded information tracks is recorded in the information track 4-(n+1). Every time additional recording is performed in the nonrecorded information track, the corresponding directory information is added. When the reference track 4-(n+1) is filled with the directory information, the directory information is recorded in the subsequent information tracks 4-n, 4-(n-1), . . . .

As shown in FIG. 3, a small hole 40 is formed at the upper left corner of the optical card 1.

The optical card described above is described in detail in U.S. patent application Ser. No. 036,557 (filed on Apr. 9, 1987).

Figure 5:
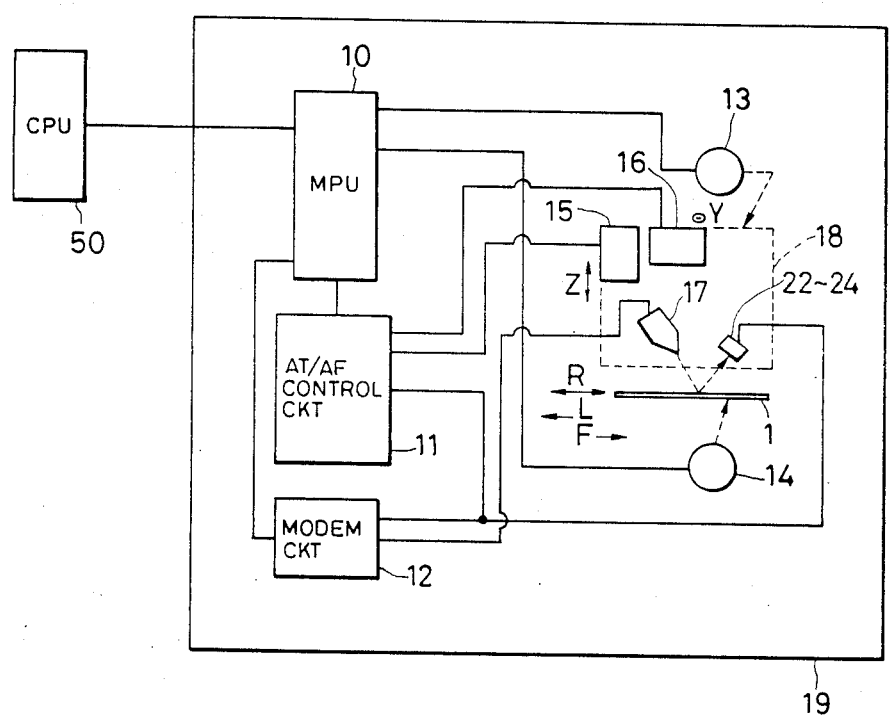
FIG. 5 is a schematic block diagram of an information recording/reproducing apparatus according to an embodiment of the present invention.

FIG. 5 is a schematic block diagram of an information recording/reproducing apparatus for recording information in the above optical card 1 and reproducing it from the optical card 1.

Referring to FIG. 5, a central processing unit (CPU) 50 as a host controller is connected to a recording/reproducing apparatus 19. The recording/reproducing apparatus 19 includes a drive motor 14 for feeding the optical card 1 therein through a transport mechanism (not shown), causing the optical card to reciprocally move at a predetermined recording/reproducing position in the R direction, and discharging the optical card 1 outside the apparatus.

The apparatus 19 also includes a light beam radiation optical system 17 including a light source. A light beam spot is formed by the optical system 17 on the optical card 1 in the recording or reproducing mode. In this embodiment, three light beam spots are formed on the optical card 1 in the recording or reproducing mode. Photodetectors 22 to 24 receive beams reflected by the optical card 1, respectively. An AF actuator 15 drives some of the components in the light beam radiation optical system 17 to move these components in the Z direction, i.e., in a direction perpendicular to the surface of the optical card, thereby performing auto focusing (AF). An AT actuator 16 drives some components in the light beam radiation optical system 17 to move the light beam spots on the optical card surface in the Y direction (i.e., a direction perpendicular to the R and Z directions), thereby performing AT control.

The light beam radiation optical system 17, the photodetectors 22 to 24, the AF actuator 15, and the AT actuator 16 constitute an optical head 18.

A drive motor 13 drives the optical head 18 in the Y direction to move the light beam spot to the desired track on the optical card 1.

The drive motors 13 and 14 are controlled by a micro processing unit (MPU) 10. Outputs from the photodetectors 22 to 24 are input to an AT/AF control circuit 11. The control circuit 11 controls the AF and AT actuators 15 and 16 to perform AF and AT on the basis of the outputs from the photodetectors 22 to 24. The outputs from the photodetectors 22 to 24 are also supplied to a modem circuit 12, and read information is demodulated. The demodulated signal is supplied to the MPU 10. The modem circuit 12 also modulates an information signal supplied from the MPU 10. The light beam radiation optical system 17 is driven in accordance with the modulated signal, thereby recording the information.

The MPU 10 is controlled by the CPU 50 and exchanges data with the CPU 50.

Figure 6:
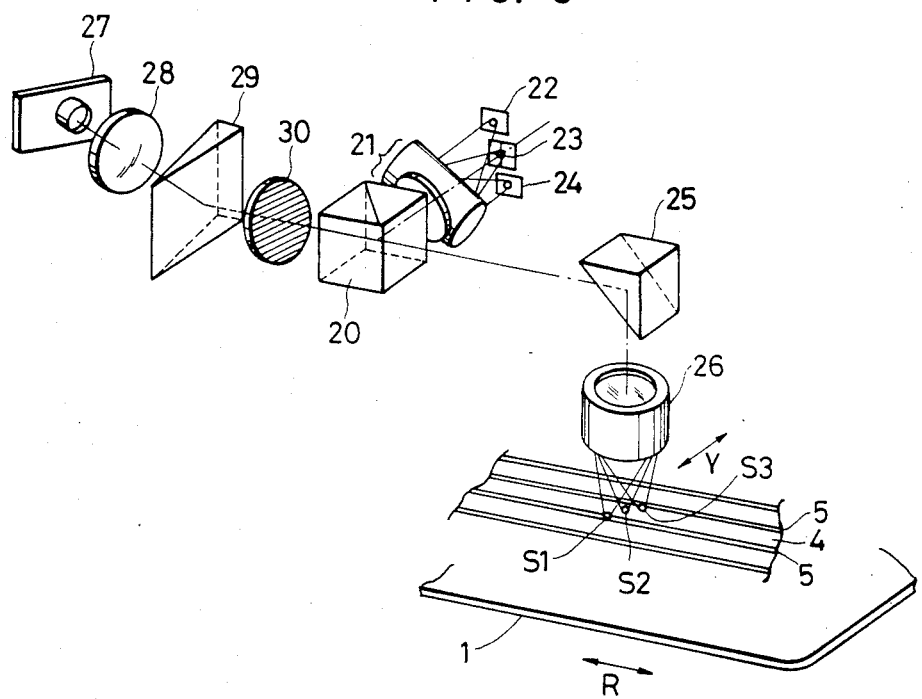
FIG. 6 is a detailed perspective view showing an optical head unit in the apparatus shown in FIG. 5.

FIG. 6 is a detailed perspective view of the optical head unit shown in FIG. 5.

Referring to FIG. 6, the optical head unit includes a semiconductor laser 27 as a light source, a collimator lens 28, a light beam shaping prism 29, a diffraction grating 30 for dividing the rays, a beam splitter 20, a reflecting prism 25, an objective lens 26, a focusing lens system 21 for astigmatism correction, and the photodetectors 22 to 24.

A laser beam emitted from the semiconductor laser 27 is a divergent beam which is then incident on the collimator lens 28. The divergent beam is converted into a parallel beam by the collimator lens 28. The parallel beam is adjusted by the light beam shaping prism 29 so as to have a predetermined light intensity distribution. The shaped beam is divided into effective three optical beams (i.e., 0th order diffracted beam and ±1st order diffracted beams) by the diffraction grating 30. Three light beams are incident on the beam splitter 20 and are transmitted therethrough. The beams are then reflected by the reflecting prism 25, and the reflected beams are incident on the objective lens 26. These beams are focused by the objective lens 26 and three small beam spots S1 (corresponding to the +1st order diffracted beam), S2 (corresponding to the 0th order diffracted beam), and S3 (corresponding to the -1st order diffracted beam) are formed on the optical card 1.

The light beam spots S1 and S3 are located on the adjacent tracking tracks 5, and the light beam spot S2 is located on the information track 4 between the adjacent tracking tracks. Beams reflected by the optical card pass through the objective lens 26 and are converted into parallel beams. The parallel beams are reflected by the reflecting prism 25 and are further reflected by the beam splitter 20. The reflected beams are focused by the focusing lens system 21 and are respectively incident on the photodetectors 22, 23, and 24.

Figure 7:
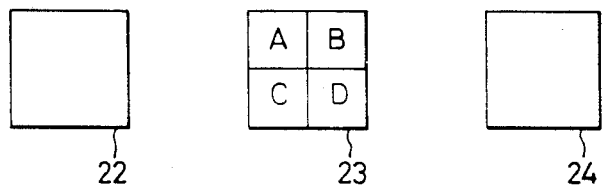
FIG. 7 is a view showing a photodetector in the optical head unit.

FIG. 7 is a view of the photodetectors 22 to 24 when their light-receiving surfaces are viewed from the light incident direction. The photodetector 23 is a four-split photodetector.

Figure 8A:
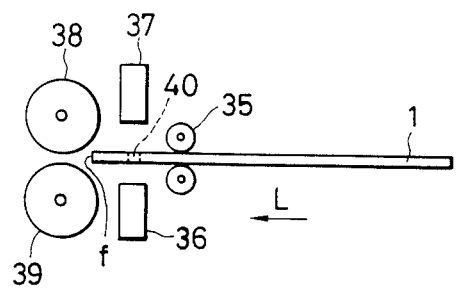
FIGS. 8A, 8B, and 8C are a side view, a plan view, and a front view, respectively, showing part of an optical card transport mechanism.
Figure 8B:
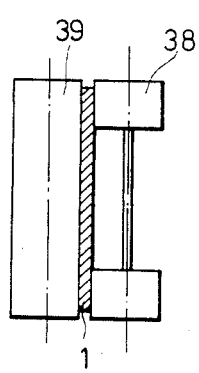
Figure 8C:
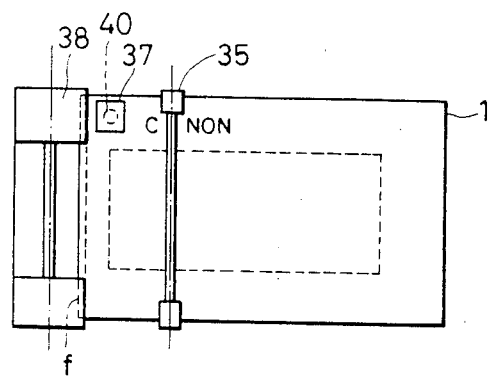

FIGS. 8A, 8B, and 8C are a side view, a plan view, and a front view, respectively, showing an optical card transport mechanism in the recording/reproducing apparatus.

Referring to FIGS. 8A to 8C, the optical card transport mechanism includes optical card load/unload rollers 35. When a photodetector (not shown) detects that the card 1 has been inserted in the recording/reproducing apparatus, the rollers 35 are driven by a driving force of the drive motor 14. The optical card 1 is moved toward the recording/reproducing position in the L direction. In this case, the moving state of the optical card 1 is detected by using a light-emitting element 37 and a light-receiving element 36. Rollers 38 and 39 are used to move the optical card 1 to the recording/reproducing position and to reciprocally move the optical card 1 at the recording/reproducing position in the LF direction. A plurality of rollers, as the rollers 38 and 39 are arranged along the LF direction. These rollers are driven by a driving force of the drive motor 14 after the light-emitting element 37 and the light-receiving element 36 detect that the optical card has reached the recording/reproducing position.

An operation for performing recording/reproduction using the above optical card and the above recording-/reproducing apparatus will be described below.

The optical card 1 is loaded in the recording/reproducing apparatus, and the rollers 35 shown in FIG. 8A are driven to move the optical card 1 in the L direction.

Figure 9:
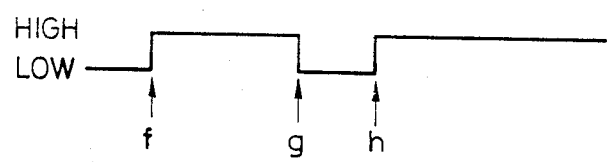
FIG. 9 is a chart showing a signal output from a light-receiving element shown in FIG. 8.

FIG. 9 is a chart showing a signal output from the light-receiving element 36 shown in FIG. 8A when the card 1 is loaded. When a position f (i.e., the leading end of the optical card) shown in FIG. 3 reaches the position of the light-receiving element, a signal of low level goes to high level. When a portion (i.e., a portion of the small hole 40) defined between a position g and a position h in FIG. 3 is located at the position of the light-receiving element, the signal goes to low level, again. When such a pattern signal is obtained and a distance between the positions f and g is calculated to be a predetermined distance on the basis of the signal, correct insertion of the optical card 1 is discriminated. If the above signal is not obtained and therefore, correct insertion of the optical card 1 is not discriminated, the rollers 35 are immediately rotated in the reverse direction to discharge the optical card 1 from the recording/reproducing apparatus. Incorrect insertion and card discharge are signalled to the operator by a means, such as a lamp or buzzer, thereby causing the operator to correctly insert the optical card 1.

If correct insertion of the optical card 1 is discriminated, driving of the optical card by the rollers 35 and the rollers 38 and 39 in the L direction continues. When a predetermined period of time has passed after detection of the small hole 40, the rollers 35 and the rollers 38 and 39 are stopped. In this state, the light beam spot is located at the home position 3.

Detection for card insertion is described in detail in U.S. Pat. No. 4,829,168.

Figure 10:
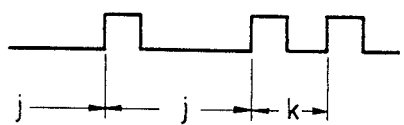
FIG. 10 is a chart showing a signal output from the photodetector shown in FIG. 5.

In order to access the light beam spot to the reference track 4-0, the optical head 18 is driven by the drive motor 13 in the D direction in FIG. 3. A signal shown in FIG. 10 is obtained from the photodetector 23 corresponding to the light beam spot S2 upon movement of this spot. As shown in FIG. 3, since the G mark 7 is located at the position corresponding to the home position 3, an interval j appears until the tracking track 5-0 is detected. However, upon detection of the G mark 7, a relatively short interval k appears. When this interval k appears, the optical head 18 is stopped.

The transport mechanism is driven by the drive motor 14 to move the optical card 1 in the L direction, thereby recording or reproducing information. The recording medium discrimination pattern 8 is read by this reproduction to determine whether the optical card can be the one registered in a read-only memory (ROM) in the MPU 10. The determination result is sent to the CPU 50.

The light beam spot is returned to the home position 3, and the optical head 18 is driven by the drive motor 13 in the D direction. The light beam spot is temporarily shifted outside the tracking track 5 $(n+2)'$ The light beam spot S2 is then moved in a direction opposite to the D direction. In the same manner as in access to the reference track 4-0, the spot is accessed to the reference track 4-$(n+1)$. Similarly, the directory information is read as the recording information of the information track and is recorded in a random access memory (RAM) in the MPU 10. Thereafter, the light beam spot is returned to the home position 3.

A recording command signal is input from the CPU 50 to the MPU 10 in the recording/reproducing apparatus. The MPU 10 determines a physical track number corresponding to the first information track 5-$(m+1)$ of the nonrecorded information tracks. The physical track numbers are assigned to the tracks from the reference track 4-0.

After the track number command is generated, the card 1 is moved by a predetermined distance in the F direction in the recording/reproducing apparatus. The light beam spot is moved to the position corresponding to the tracking track end portion.

The optical head 18 is moved by the drive motor 13 in the D direction while the optical card 1 is maintained stopped. Therefore, the light beam spot is relatively moved on the optical card 1 in the D direction. In this case, the reflected beam of the light beam spot S2 is detected by the photodetector 23, thereby counting the number of tracking tracks.

Figure 11:
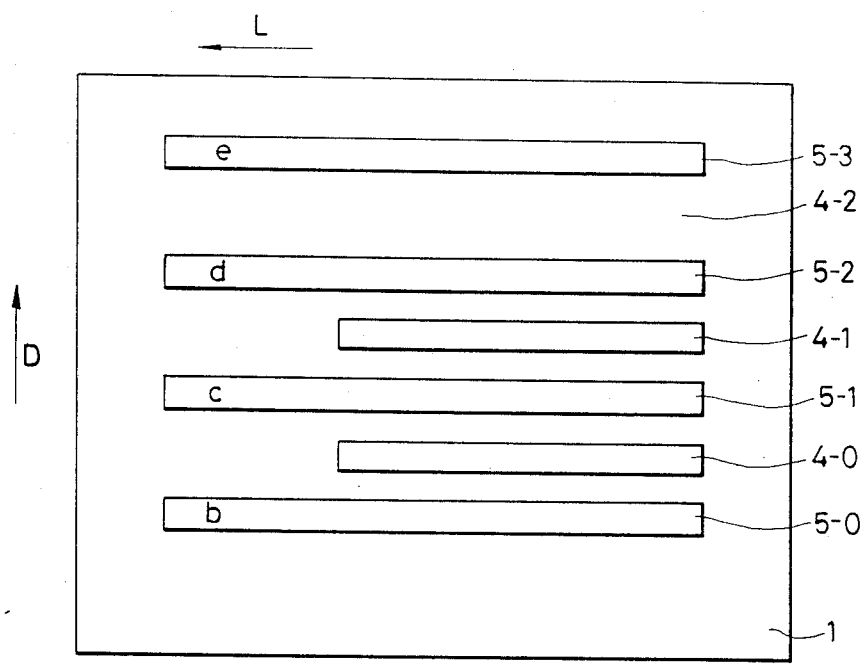
FIG. 11 is an enlarged view showing part of the optical card/shown in FIG. 3.
Figure 12:
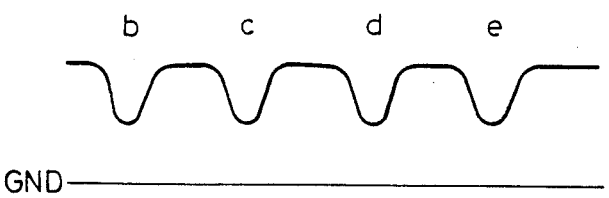
FIG. 12 is a chart showing an output from the photodetector shown in FIG. 5.

FIG. 11 is an enlarged view showing part of the optical card 1. FIG. 12 shows an output from the photodetector 23 when the number of tracking tracks is counted upon movement of the beam. Portions b to e in FIG. 12 correspond to portions b to e in FIG. 11, respectively. A pulse appears for every tracking track. By counting the number of pulses, the physical track number can be immediately detected. Note that the pulses for the guide tracks are omitted. The beam can be immediately accessed to the target information track 4-$(m+1)$.

Figure 13:
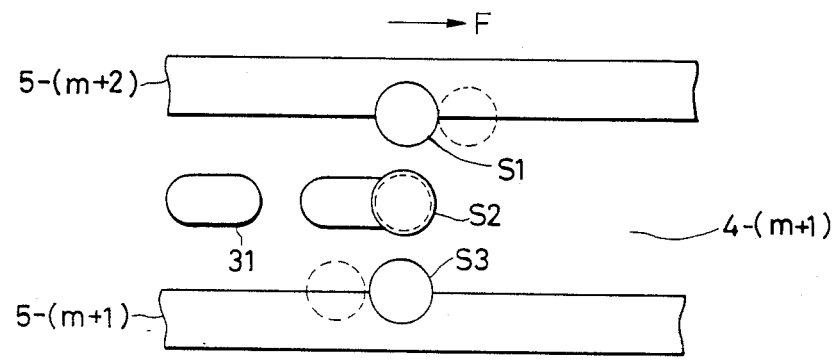
FIG. 13 is a view for explaining the relationship between the light beam spot and the track in the recording mode.

When target information track access is completed, information is recorded in this information track. FIG. 13 shows the relationship between the light beam spot and the track in the recording mode. The light beam spots S1 and S3 are incident across the tracking tracks 5-$(m+1)$ and 5-$(m+2)$. Reflected beams of the beams S1 and S3 are detected by the photodetectors 22 and 24, respectively. The AT actuator 16 is driven such that the amount of light received by the photodetector 22 becomes equal to that of the photodetector 24, thereby performing AT. The light beam spot S2 is incident on the information track 4-$(m+1)$, and an information bit 31 is recorded upon movement of the optical card. At the same time, the reflected beam of the light beam spot S2 is detected by the 4-split photodetector 23. The AF actuator 15 is driven such that the amounts of light received by the four split regions of the light-receiving surface are equal to each other, thereby performing AF.

Referring to FIG. 13, the three light beam spots may be aligned in a direction perpendicular to the information tracks. However, the alignment direction of the three beam spots may be vertically inclined with respect to the information tracks, as indicated by dotted circles. The method of detecting the AT signal described above is described in detail in U.S. patent application Ser. No. 033,789 filed by the present application now abandoned in favor of Ser. No. 479,205.

After the information is recorded in the information track as described above, the directory information representing the physical track number of the recorded information track and the contents of the recording information is added to the directory.

In the information reproducing mode, the beam is accessed to the target information track in the same manner as described above.

Figure 14:
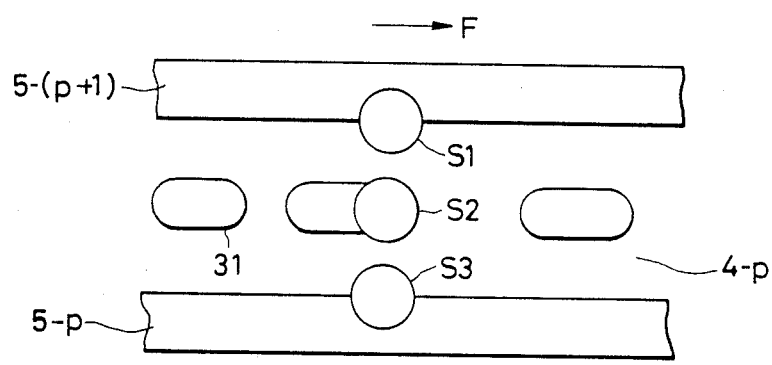
FIG. 14 is a view for explaining the relationship between the light beam spot and the track in the reproducing mode.

FIG. 14 shows the relationship between the light beam spot and the track in the reproducing mode. The light beam spots S1 and S3 are incident across the tracking tracks 5-p and 5-(p+1), respectively. The light beam spot S2 is incident on the recorded information track 4-p (where p ≦ m).

Reproduced data information is transferred from the MPU 10 to the CPU 50.

In this embodiment, since only the light beam spot is moved in the direction perpendicular to the information track while the optical card is maintained stopped, the count of tracks can be accurately performed. The light beam spot can be moved in the direction perpendicular to the longitudinal direction of the track, while the optical card is reciprocally moved in the longitudinal direction. In this case, in practice, a certain angle (skew) is formed between the card moving direction and the longitudinal direction of the information tracks, and times for causing the light beam spot to cross the tracking tracks are different, resulting in detection signal variations. Counting based on these detection signal variations result in count errors. However, the above embodiment can eliminate the above disadvantage.

Figure 15:
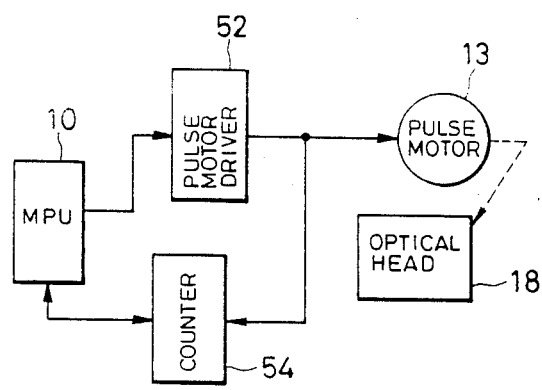
FIG. 15 is a block diagram showing the main part of the apparatus for practicing the method of the present invention.

FIG. 15 is a block diagram of an information recording/reproducing apparatus according to another embodiment of the present invention.

The arrangement of this apparatus is substantially the same as that of the apparatus shown in FIG. 5. However, in the apparatus in FIG. 15, a drive motor 13 for driving the optical head comprises a pulse motor. The pulse motor is controlled by a pulse motor driver 52 in accordance with a command or order from the MPU 10. A pulse signal is input from the driver 52 to the pulse motor 13, and the pulse motor 13 is rotated by an angle corresponding to the number of input pulses. Therefore, the optical head 18 is moved by a distance corresponding to the number of input pulses.

The pulse signal output from the pulse motor driver 52 is also input to a pulse counter 54. The pulse counter 54 counts the number of input pulses and sends an end command signal to the MPU when the count reaches the number of pulses corresponding to the distance to the target information track. In response to the command signal, the MPU 10 sends a drive end signal to the motor driver 52. At this time, pulse transmission to the pulse motor 13 is stopped. The optical head 18 is stopped at a position corresponding to the target information track, and therefore, track access is completed. Thereafter, the optical card 18 is moved in the LF direction to check its track number, and information is recorded or reproduced in or from the target information track.

Figure 16:
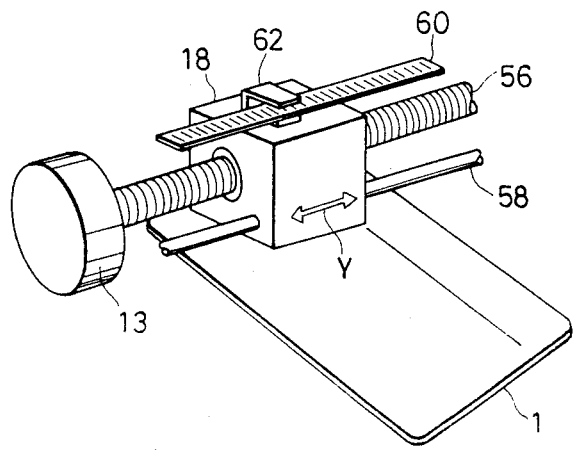
FIG. 16 is a perspective view showing the main part of the apparatus for practicing the method of the present invention.

FIG. 16 is a perspective view showing the main part of an information recording/reproducing apparatus according to still another embodiment of the present invention.

The arrangement of this apparatus is substantially the same as that of the apparatus shown in FIG. 5. However, the apparatus of FIG. 16 further includes a means for measuring a moving distance of the optical head 18. More specifically, as shown in FIG. 16, the optical head 18 is threadably coupled to a feed screw 56 coupled to the rotating shaft of a drive motor 13. The optical head 18 is slidably coupled to a guide rod 58 and is reciprocally moved in the Y direction upon rotation of the drive motor 13. A linear encoder is included in this apparatus to measure a moving distance of the optical head 18 in the Y direction. Referring to FIG. 16, a linear scale 60 is fixed on the housing of the apparatus. A detector 62 is mounted on the optical head 18 to read the linear scale. The linear scale 60 and the detector 62 constitute a linear encoder.

In this apparatus, since the moving distance of the optical head 18 can actually be measured by the linear encoder, the drive motor 13 is stopped when the actually measured distance reaches a preset distance to the target information track, thereby completing access to the target information track.

In the arrangements shown in FIGS. 15 and 16, the number of tracking tracks need not be counted.

In the above embodiments, since only the optical head 18 is moved in the direction, perpendicular to the information track direction while the optical card 1 is maintained stopped, thereby accessing the target information track, vibrations caused by reciprocal movement of the optical card are not generated. Therefore, high-speed, accurate track access can be performed.

Figure 17:
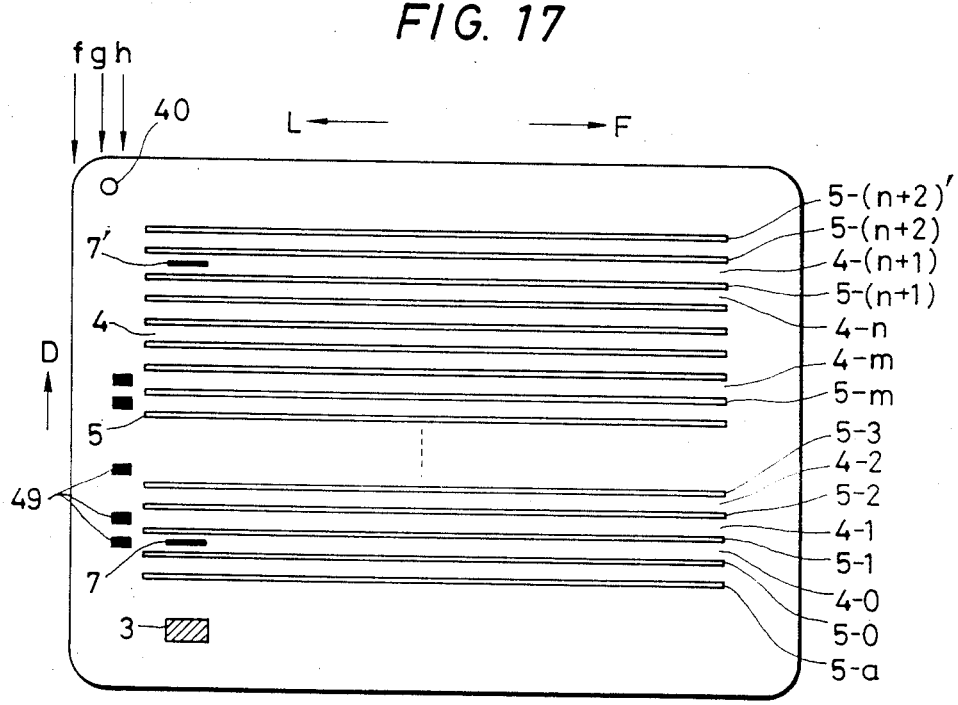
FIG. 17 is a plan view showing another optical card used in the present invention.

FIG. 17 is a plan view showing another optical card used in the present invention. The same reference numerals as in FIG. 3 denote the same parts in FIG. 17, and detailed description thereof will be omitted.

In this embodiment, no-error marks 49 are added to recorded information tracks at end positions in the L direction of the recorded information tracks if they do not have errors. The no-error mark is recorded as follows. After information is recorded in each information track, the recorded contents are discriminated to determine whether an error is present in the reproduced information. If no error is detected, a no-error mark is recorded at the predetermined position with a light beam spot. A no-error mark is not added to the information track 4-2 in FIG. 17. This means that an error is present in the information recorded in the information track 4-2. Assignment of a mark representing the presence/absence of an error is described in detail in U.S. Pat. No. 4,872,154.

When the optical card shown in FIG. 17 is used, the recording/reproducing means is moved in only the direction perpendicular to the information tracks relative to the information recording medium to detect no-error marks. The number of effective information tracks can be counted by the number of no-error marks, and the beam is accessed to the target information track. An apparatus for recording information in or reproducing it from this optical card can be arranged in the same manner as in FIGS. 5 to 9.

When the card is loaded in the apparatus to record information, a recording command signal is sent from the CPU 50 to the MPU 10 in the recording/reproducing apparatus. The MPU determines the logical track number corresponding to the first information track 5-(m+1) of the nonrecorded information tracks. The logical track numbers are assigned to the tracks from the reference track 4-0 except for tracks with errors (i.e., the information tracks without no-error marks 49).

In the recording/reproducing apparatus, the optical card 1 is moved by a predetermined distance in the F direction immediately after the track number command is sent. The light beam spot is moved to the position corresponding to the no-error mark.

The optical head 18 is driven by the drive motor in the D direction while the optical card 1 is maintained stopped. The light beam spot is moved on the optical card 1 in the D direction. In this case, the reflected beam of the light beam spot S2 is detected by the photodetector 23, thereby counting the number of no-error marks.

Figure 18:
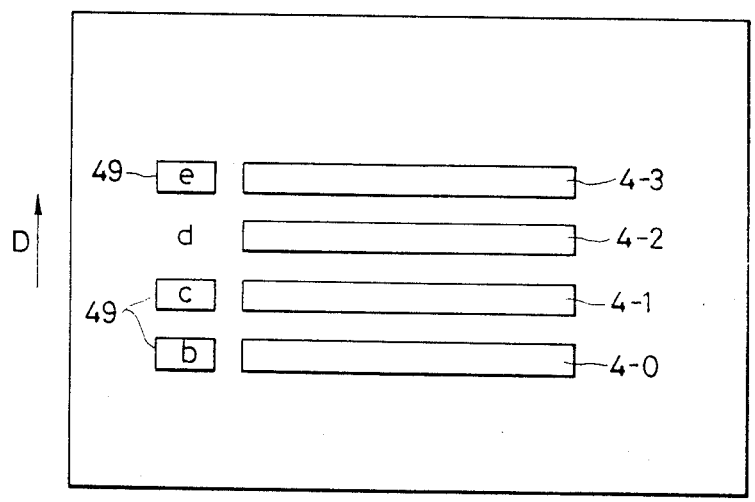
FIG. 18 is an enlarged view showing part of the optical card shown in FIG. 17.
Figure 19:
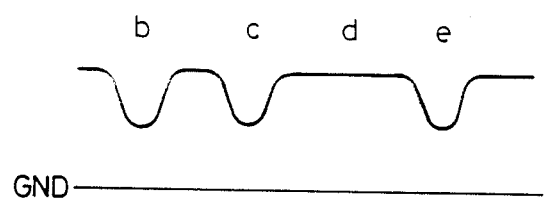
FIG. 19 is a chart showing an output from the photodetector when the card shown in FIG. 17 is used.

FIG. 18 is an enlarged view showing part of the optical card 1 shown in FIG. 17. Since the recorded information track 4-2 is a track with an error, a no-error mark is not assigned thereto. FIG. 19 shows an output from the photodetector 23 when the number of no-error marks is counted upon movement of the light beam spot. Portions b to e in FIG. 19 correspond to portions b to e in FIG. 18. A pulse appears upon detection of every no-error mark 49. No-error mark detection pulses are counted to immediately detect the logical track number. The light beam can be accessed to the information track 4-$m$ immediately preceding the target information track 4-$(m+1)$. The light beam spot is then moved by one track pitch, thereby easily accessing the target information track.

When target information track access is completed, information is recorded in the target information track.

Figure 20:
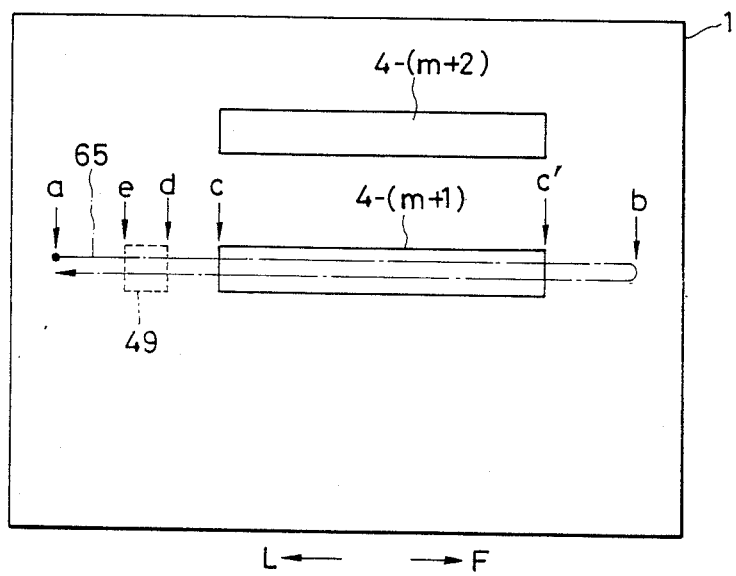
FIG. 20 is a view for explaining the operation when information is recorded in the optical card shown in FIG. 17.

FIG. 20 is a view for explaining recording.

Figure 21A:
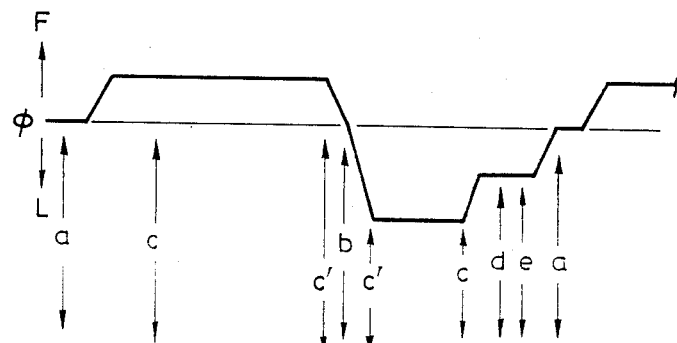
FIG. 21A is a view showing a moving speed or rate of the light/beam spot.
Figure 21B:
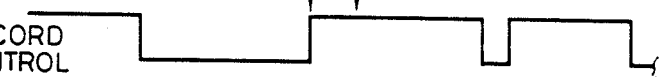
FIG. 21B is a chart showing a recording timing in response to movement.
Figure 22:
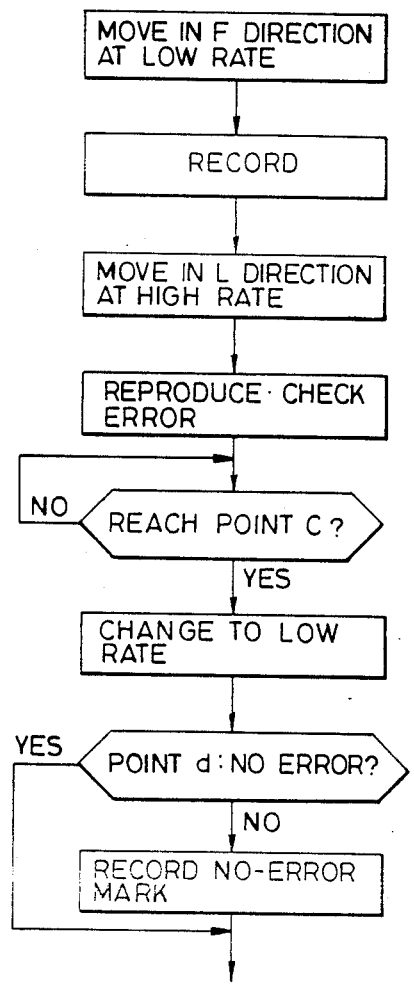
FIG. 22 is a flowchart for explaining the operation for recording information in the optical card shown in FIG. 17.

Referring to FIG. 20, the light beam spot S2 has a moving path 65. FIG. 21A is a chart showing a moving rate change in light beam spot S2, and FIG. 21B is a chart showing a recording timing upon movement of the spot S2. FIG. 22 is a flow chart for explaining recording.

When the target information track access is completed, the optical card 1 is moved in the L direction to move the light beam spot S2 from a position a in the F direction at a relatively low rate. In this case, information is recorded in the information track 4-$(m+1)$ for a period defined by positions c and c'. The moving direction of the light beam spot is reversed when the spot reaches a position b. Thereafter, the light beam spot is moved in the L direction at a relatively high rate. A light intensity of the light source is set to be a relatively low level which does not allow recording. Information is reproduced from the recorded information track 4-$(m+1)$ and whether the recorded content includes an error is checked on the basis of an amount of light received by the photodetector 23. This error check continues until the light beam spot reaches the position c. After the position c, the light beam spot is moved at a relatively low rate in the same manner as in movement in the F direction. As a result of the error check, if no error is detected, the no-error mark 49 is recorded by increasing the intensity of the light beam spot S2 while the beam is located between positions d and e on a line extending from the information track. However, if an error is detected as a result of the check, recording of a no-error mark is not performed.

When information is to be continuously recorded, the light beam spot is moved by one track pitch upon movement of the optical head, and the above operations are repeated. If an error is detected in the error check operation after recording, the identical information is recorded in the next information track.

After recording in the information tracks is completed as described above, the directory information representing the logical track number of the recorded information track and the contents of the recorded information is added to the directory.

In the reproducing mode, the beam spot can be accessed to the target information track in the same manner as in the recording mode.

Figure 23:
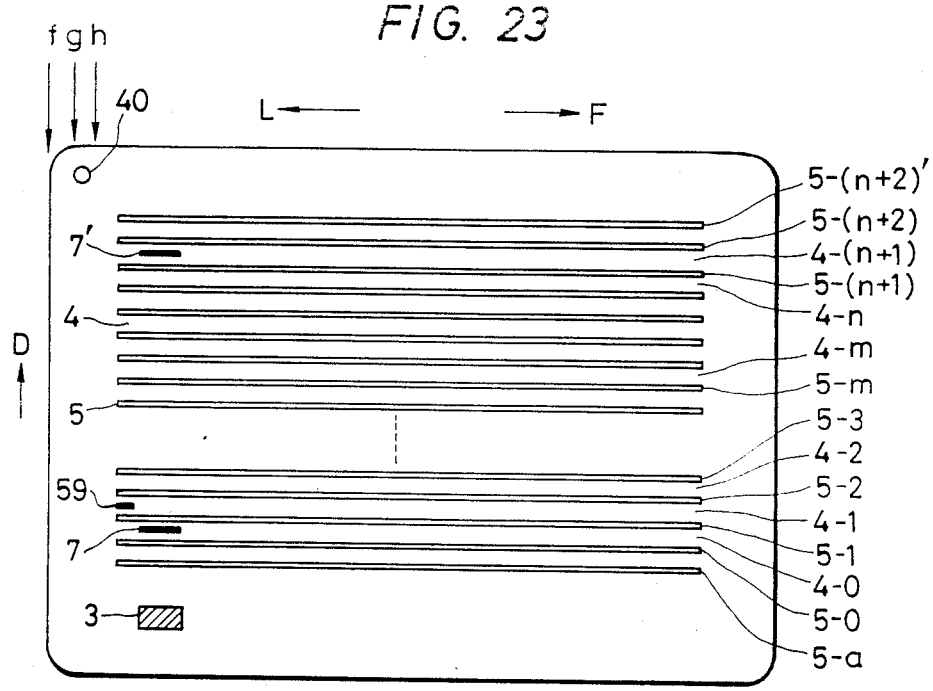
FIG. 23 is a plan view showing still another optical card used in the present invention.

FIG. 23 is a plan view showing still another optical card used in the present invention. The same reference numerals as in FIG. 3 denote the same parts in FIG. 23, and a detailed description thereof will be omitted.

In this embodiment, if an error is present in information recorded in an information track, an error mark 59 is assigned to this information track. The error mark is recorded as follows. After information is recorded in a given information track and is reproduced therefrom, the reproduced content is checked to determine whether an error is present. If an error is detected, an error mark is recorded at a predetermined position with a light beam spot. The error mark 59 is assigned to the information track 4-1 in FIG. 23. This indicates that the information recorded in the information track 4-1 includes an error.

When the optical card shown in FIG. 23 is used, only the recording/reproducing means is relatively moved in the direction perpendicular to the information tracks to detect the tracking tracks and error marks. The number of effective information tracks can be counted on the basis of the number of error marks, thereby accessing the target information track. An apparatus for recording information in this optical card or reproducing it therefrom can be arranged in the same manner as in FIGS. 5 to 9.

When the card is loaded in the apparatus to record information, a recording command signal is sent from the CPU 50 to the MPU 10 in the recording/reproducing apparatus. The MPU determines a logical track number corresponding to the first information track 5-$(m+1)$ of the nonrecorded information tracks on the basis of the recording command signal. The logical track numbers are sequentially assigned to the tracks from the reference track 4-0, except for tracks with errors (i.e., information tracks with the error marks 59).

In the recording/reproducing apparatus, after a track number command is received, the optical card 1 is moved by a predetermined distance in the F direction, and the light beam spot is moved to the position corresponding to the error mark.

The optical head 18 is moved by the drive motor 13 in the D direction while the optical card 1 is maintained stopped. The optical beam spot is moved on the optical card 1 in the D direction. In this case, the reflected beam of the light beam spot S2 is detected by the photodetector 23 to count the number of tracking tracks and the number of error marks.

Figure 24:
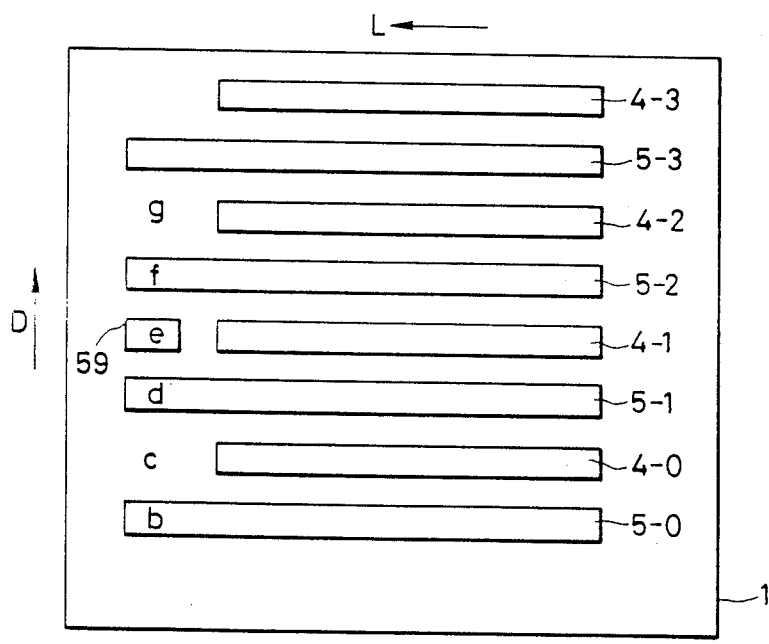
FIG. 24 is an enlarged view showing part of the optical card in FIG. 23.
Figure 25:
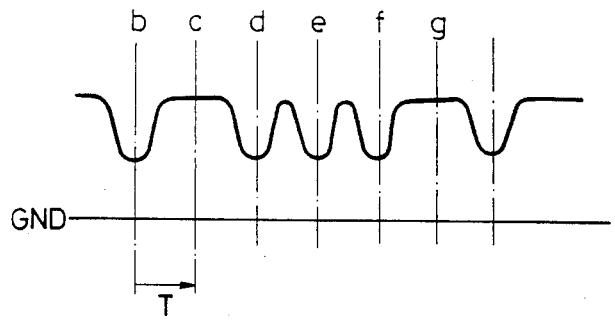
FIG. 25 is a chart showing an output from the photodetector when the optical card shown in FIG. 23 is used.

FIG. 24 is an enlarged view showing part of the optical card 1 shown in FIG. 23. Since the recorded information track 4-1 is a track with an error, the error mark 59 is assigned thereto. FIG. 25 shows an output from the photodetector 23 when the number of tracking tracks and the number of error marks are counted upon movement of the beam spot. Portions b to g in FIG. 25 correspond to portions b to g in FIG. 24, respectively. A pulse appears every time a tracking track or an error mark 59 is detected. When the error mark 59 is detected, it is detected during a detection period of the adjacent tracks. A time T which is ½ the tracking track detection interval is set in a timer or the like, and an output from the photodetector is detected every time T, thereby counting both the number of tracking tracks and the number of error marks. Therefore, by subtracting the error mark count from the tracking track count obtained upon movement of the light beam spot, the logical track number can be immediately detected. Note that the guide tracks are not counted. The beam spot can be immediately accessed to the target information track 4-$(m+1)$.

After target information track access is completed, information is recorded in the target track.

Figure 26:
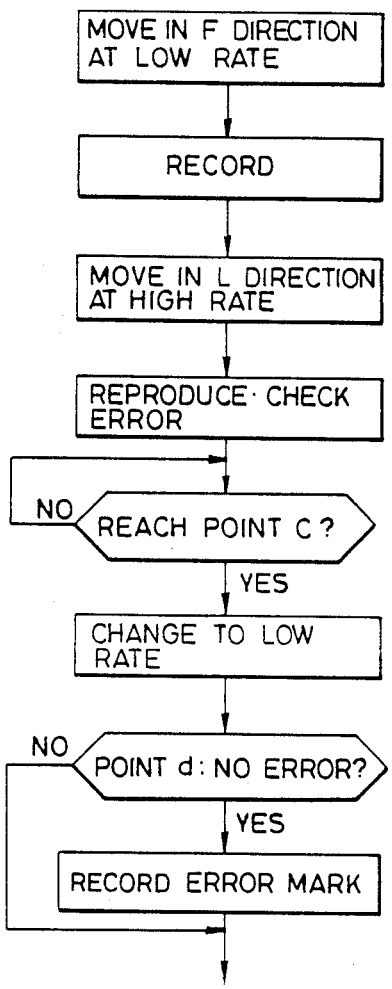
FIG. 26 is a flow chart for explaining the operation for recording information in the optical card shown in FIG. 23.

The recording operation is the same as that described in FIGS. 20 and 21, except that the error mark in place of the no-error mark is recorded. FIG. 26 is a flow chart for explaining the operation in the recording mode. Similarly, in the reproducing mode, the target information track access is performed in the same manner as in the recording mode.

In the above embodiment, prior to recording or reproduction of information, the light beam spot is returned to the home position and is then accessed to the target information track. However, recording or reproduction continues after the previous recording or reproduction cycle is completed, the light beam spot can be immediately accessed to the next target information track. Since the physical track number corresponding to the current position of the light beam spot is known prior to movement of the beam spot, the number of information tracks through which the light beam has passed is subtracted from or added to the physical track number to obtain a physical track number after the movement of the beam spot. With this arrangement, the target information track access can be performed at a higher speed.

In the above embodiment, the optical head is moved in a direction perpendicular to the tracks. The move rate of the optical card in the longitudinal direction of the track is preferably zero in the kick operation to be described later.

Figure 27:
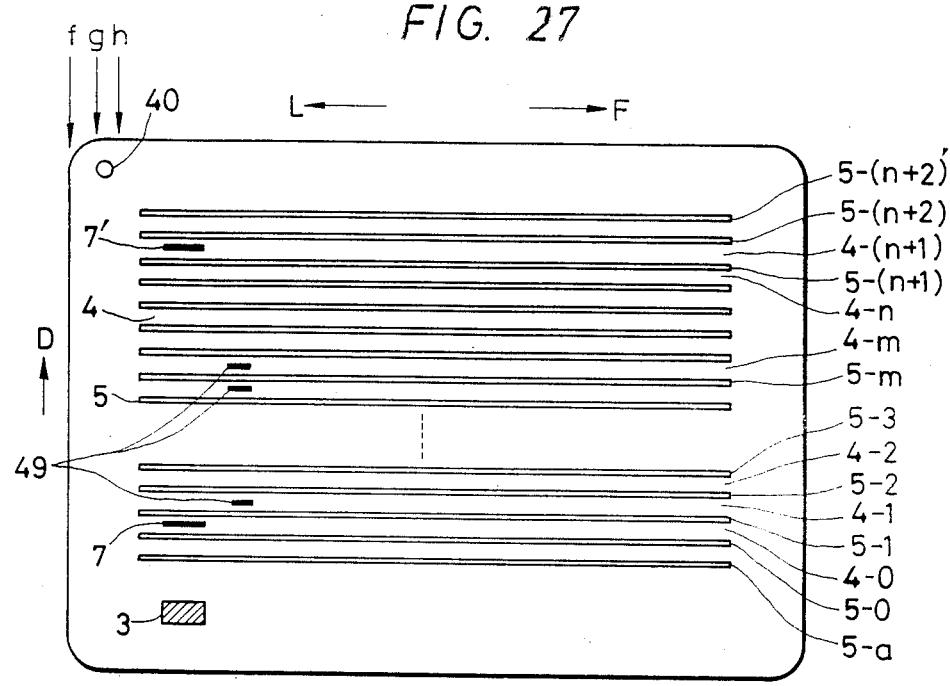
FIG. 27 is a plan view showing still another optical card/used in the present invention.

FIG. 27 is a plan view showing still another optical card used in the present invention. The same reference numerals as in FIG. 17 denote the same parts in FIG. 27, and a detailed description thereof will be omitted. In this embodiment, the position of a no-error mark 49 is different from that in FIG. 17.

Figure 28:
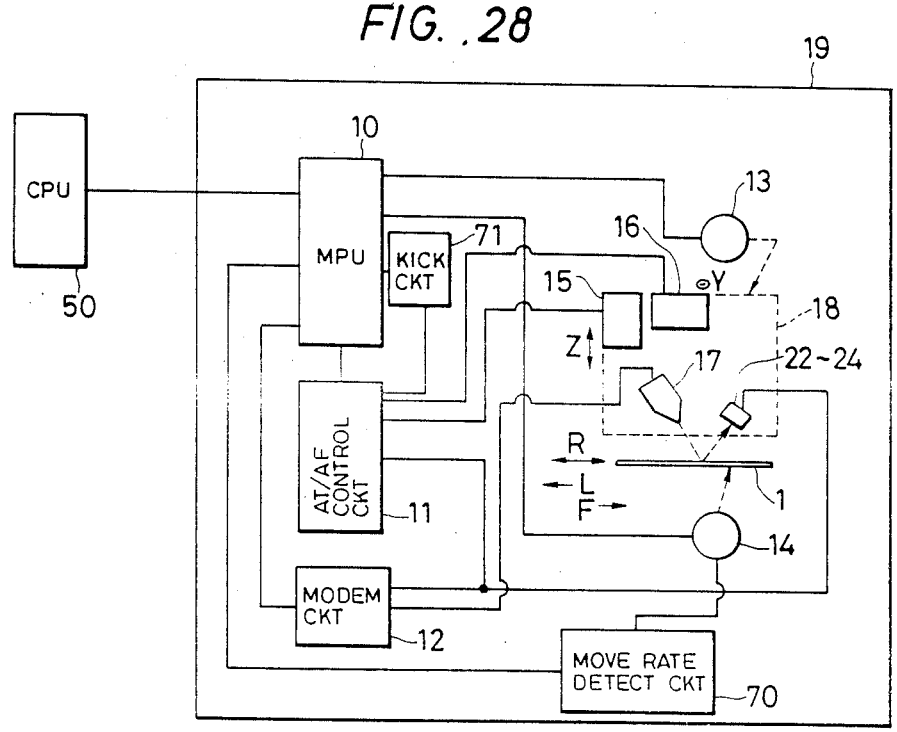
FIG. 28 is a schematic block diagram showing an information recording/reproducing apparatus according to another embodiment of the present invention.

FIG. 28 is a block diagram of a recording/reproducing apparatus using an optical card 1 shown in FIG. 27. The same reference numerals as in FIG. 5 denote the same parts in FIG. 28, and a detailed description thereof will be omitted.

In the apparatus of FIG. 28, a move rate detect circuit 70 detects a move rate of the optical card by utilizing a drive motor 14. A kick circuit 71 orders opening/closing of the AT control loop and the kick operation for the AT/AF control circuit 11. An optical head 18 is arranged in the same manner as in FIGS. 6 and 7.

In this embodiment, relative movement between the optical head and the optical information recording medium in the information track direction is substantially eliminated. Some of the parts in the optical system in the optical head are moved to shift the light beam spot to the adjacent information track in a direction across the information tracks, thereby performing the kick operation.

Figure 29:
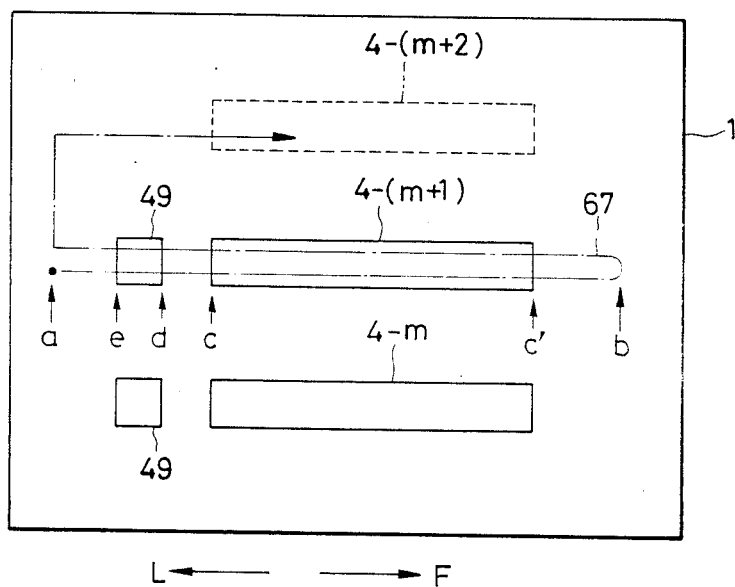
FIG. 29 is a view for explaining the operation of the apparatus shown in FIG. 28 in the recording mode.

FIG. 29 is a view for explaining the operation in the recording mode in detail.

Figure 30A:
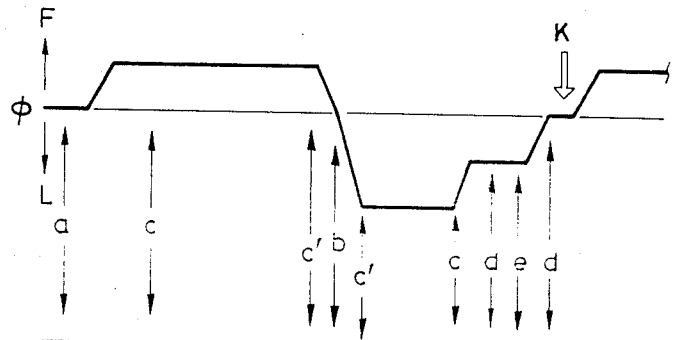
FIG. 30A is a chart for explaining a change in moving rate of the light beam spot in the apparatus shown in FIG. 28.
Figure 30B:
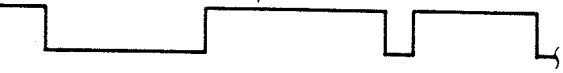
FIG. 30B is a chart showing a recording timing in response to movement of the spot.
Figure 31:
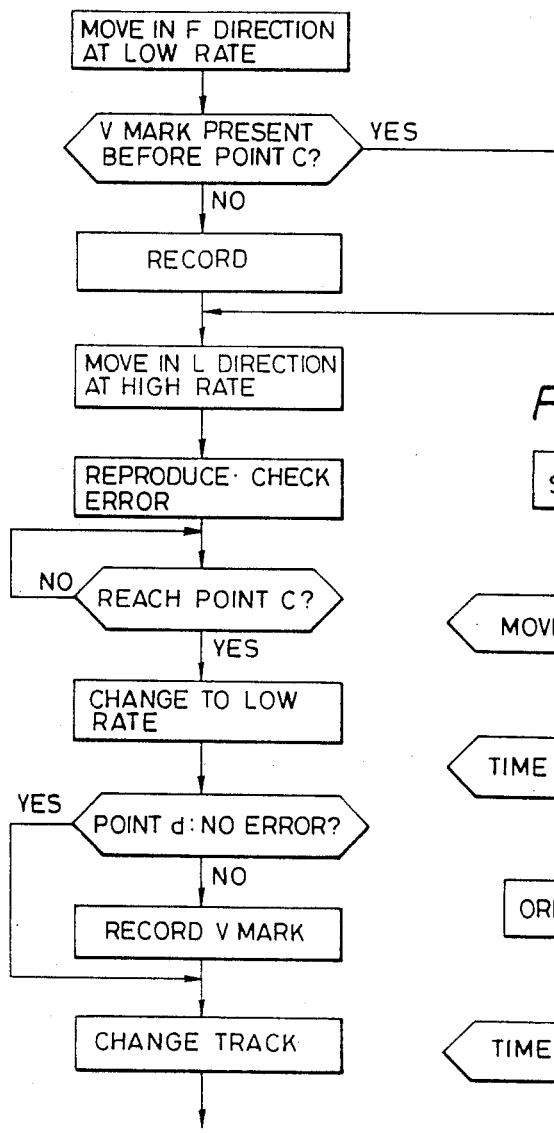
FIG. 31 is a flowchart for explaining the operation of the apparatus shown in FIG. 28 in the recording mode.

Referring to FIG. 29, the light beam spot S2 has a moving path 67. FIG. 30A shows changes in moving rate of the light beam spot S2 upon its movement, and FIG. 30B shows a recording timing upon movement of the beam spot. FIG. 31 is a flow chart for explaining the operation in the recording mode.

The optical card 1 is moved in the L direction to move the light beam spot S2 from a position a on the optical card 1 in the F direction at a relatively low rate. In this case, if no V mark is detected until a position c, information is recorded in the information track 4-(m+1) between the position c and a position c'. However, if a V mark is detected until the position c, no recording is performed since the track is a recorded information track, without an error. When the light beam spot reaches the position b, its moving direction is reversed. The light beam spot S2 is moved in the L direction at a relatively high speed. In this case, the intensity of the light source is set to be a relatively low level which does not allow recording. The information is reproduced from the recorded information track 4-(m+1) to check on the basis of an amount of light received by the photodetector 23, whether the reproduced contents include an error. This error check continues until the light beam spot reaches the position c. After the position c, the light beam spot is moved at a relatively low rate in the same manner as in movement in the F direction. As a result of the error check, if no error is detected, the intensity of the light beam spot S2 is increased and a V mark 49 is recorded while the light beam spot is located at a position between positions d and e on a line extending on the information track. However, if an error is detected as a result of the error check, no V mark is recorded.

When information is continuously recorded, the kick operation is performed to move the light beam spot to the next adjacent track.

Figure 34:
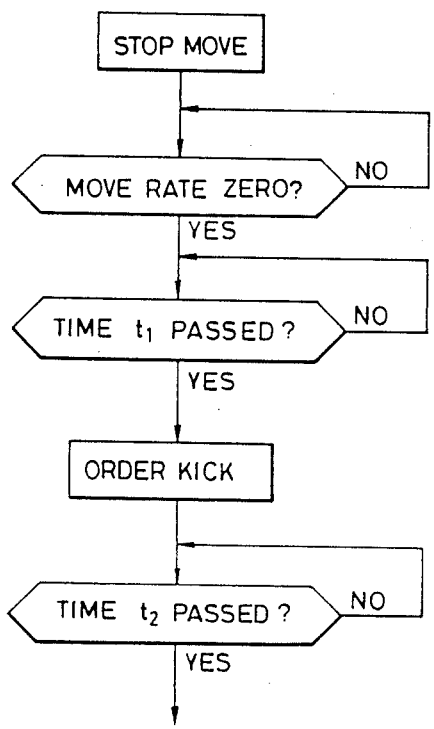
FIG. 34 is a flow chart for explaining the kick operation in the apparatus shown in FIG. 28.

FIG. 32A shows moving rate changes in optical beam spot S2 before and after the kick operation and corresponds to the K portion of FIG. 30A. FIG. 32B shows a timing of the kick operation. FIG. 34 is a flow chart for explaining the kick operation.

After the light beam spot has passed the position e in the L direction, the optical head 1 is decelerated to stop the light beam spot at the position a. The move rate of the light beam spot, i.e., the move rate of the optical card 1 is detected by a move rate detect circuit 70 and is input to the MPU 10. When time $t_1$ has elapsed after the move rate becomes zero, the MPU generates a kick order to the kick circuit 71. The kick circuit orders the AT/AF control circuit 11 to output a predetermined positive kick pulse and a predetermined negative brake pulse (FIG. 32B) to the AT actuator 16. The light beam spot is moved to the adjacent information track. When time $t_2$ has elapsed after the application of the brake pulse, the kick circuit 71 orders the AT/AF control circuit 11 to close the AT control loop. The time $t_1$ is the wait time for sufficiently attenuating the vibrations generated upon abrupt deceleration and can be about 10 ms. The time $t_2$ is a matching time after the AT control loop is closed and can be about 1 ms.

After the light beam spot is moved to a new information track as described above, recording is performed as described above. If an error is detected in the error checking operation after the information is recorded in the information track prior to movement of the light beam spot, the same information is recorded in the new information track.

After the recording is performed in the information tracks as described above, directory information representing the logical track number of the recorded information track and the contents of the recorded information is added to the directory.

In the above description, the moving rate of the light beam spot is changed in the recording mode and the error check mode. However, identical moving rates may be used in these mode.

In the information reproducing mode, the target information track access is performed in the same manner as in the recording mode.

FIG. 33 shows moving rate changes in light beam spot in the reproducing mode. The kick operation can be performed in either position a or b. If the V mark is detected until the position c when the light beam spot is located at the position a at the start of reproduction, the kick operation is performed at the position b after the error check operation is completed. However, if the V mark is not detected until the position c, the kick operation is performed at the position b without performing reproduction. However, assume that the light beam spot is located at the position b at the start of reproduction. In this case, the operations until the error check operation are performed. If the V mark is not detected until the position b, the information is not accessed as the reproduced data regardless of the presence/absence of the error, and the kick operation is performed at the position a. If the V mark is detected until the position e and no error is detected, the information is accessed as the reproduced data. In this case, the kick operation is performed at the access position a. However, if an error is detected, the operations are repeated a predetermined number of times, and the kick operation is performed at the position a or b.

The kick operation is performed in the same manner as in the recording mode. Note that the deceleration states of the light beam spot prior to the kick operation are different in the recording and reproducing modes. In the reproducing mode, the beam spot is stopped from a high rate. Since vibrations generated by this deceleration are larger than those in the recording mode, the wait time $t_1$ shown in FIG. 32B must preferably be prolonged.

In this embodiment, after the move rate of the light beam spot relative to the optical card 1 in the information track direction is zero and the vibrations caused by this deceleration are sufficiently attenuated, the kick operation is performed and is free from the influence of track errors. Therefore, an accurate, stable kick operation can be performed using the preset kick pulse and the preset brake pulse.

In the above description, the recording/reproducing operation and the kick operation are alternately performed. However, the kick operations may be successively performed. For example, if the drive motor 13 is driven to move the optical head in the direction perpendicular to the information track direction, the actual information track position to which the light beam spot reaches and the target information track fall within the movable range of the objective lens driven by the AT actuator 16. In this case, the kick operations are successively performed to move the light beam spot to the target information track. In this case, when the optical card 1 is moved in the information track direction, it must be immediately decelerated and stopped. After the predetermined wait time has elapsed, the kick operation is performed as described above. In the second and subsequent kick operations, the vibrations are sufficiently attenuated, so that the wait time is not required. Note that the matching time cannot be omitted.

In the above embodiment, the moving rate detect circuit 70 is used to detect a zero moving rate. The kick operation is performed after the predetermined wait time has elapsed. Since the time required for actually stopping the optical card after the stop command or order is sent from the MPU 10 to the drive motor 14 is substantially constant, variations between the time for stopping the light beam spot upon generation of the stop command from the MPU 10 and the time required for sufficiently attenuating the vibrations are taken into consideration. In this case, the kick operation is performed after these time intervals have elapsed. In this case, the move rate detect circuit 70 in FIG. 28 can be omitted.

The present invention is not limited to the particular embodiments described above. Various changes and modifications may be made. For example, the shape of the information recording medium is not limited to a card-like medium, but can be replaced with a tape-like medium or the like. The present invention exemplifies an apparatus for performing both recording and reproduction. However, the present invention may be applied to an apparatus for performing only recording or only reproduction. All these modifications and changes are included in the present invention without departing from the scope of the appended claims.

What is claimed is:

1. A method of accessing a light beam to a desired track of a plurality of parallel tracks on an information recording medium for effecting at least one of recording and reproduction, said method comprising the steps of:
    moving the light beam and the medium relative to each other in a longitudinal direction of the parallel tracks for effecting recording or reproduction of information;
    stopping the relative movement in the longitudinal direction of the parallel tracks;
    relatively moving the light beam towards a desired track in a direction crossing the parallel tracks when a predetermined time period has elapsed after the relative movement has stopped.

2. A method according to claim 1, further comprising the step of counting the number of tracks crossed by the light beam while relatively moving in the direction crossing the parallel tracks.

3. A method according to claim 2, wherein the recording medium comprises a tracking track adjacent to each of the plurality of parallel tracks for detecting a tracking signal, and further comprising the step of detecting a tracking track crossing signal for obtaining a track count.

4. A method according to claim 1, further comprising the step of attenuating vibrations caused by stopping the relative movement, during the predetermined period.

5. A method according to claim 1, wherein the recording medium comprises a card-like optical information recording medium.

6. A method of accessing recording and/or reproducing means to a desired track of a plurality of parallel tracks on an information recording medium having a no-error mark recorded in a recorded track indicating that information recorded in that track does not contain error, said method comprising the steps of:
    moving said recording and/or reproducing means and the medium relative to each other in a longitudinal direction of the parallel tracks for effecting recording or reproduction of information;
    stopping the relative movement in the longitudinal direction of the parallel tracks;
    relatively moving said recording and/or reproducing means towards a desired track in a direction crossing the parallel tracks; and
    counting the number of no-error marks crossed by said reading and/or reproducing means while relatively moving in the direction crossing the parallel tracks.

7. A method according to claim 6, wherein said medium comprises a card-like optical information recording medium.

8. A method of accessing recording and/or reproducing means to a desired track of an information recording medium including a plurality of parallel information tracks for containing information and tracking tracks for providing a tracking signal, alternately arranged, and including an error mark recorded in a recorded information track indicating that information recorded in that track contains error, said method comprising the steps of:

moving said recording and/or reproducing means and the medium relative to each other in a longitudinal direction of the parallel tracks for effecting recording or reproduction of information;

stopping the relative movement in the longitudinal direction of the parallel tracks;

relatively moving said recording and/or reproducing means towards a desired track in a direction crossing the parallel tracks; and counting the number of tracking tracks and error marks crossed by said recording and/or reproducing means while relatively moving in the direction crossing the parallel tracks.

9. A method according to claim 8, wherein said medium comprises a card-like optical information recording medium.

10. An apparatus for optically recording and/or reproducing information comprising:

recording and/or reproducing means for recording information in and/or reproducing information from an optical recording medium comprising a plurality of parallel tracks, said recording and/or reproducing means comprising a light source for emitting a light beam for irradiating the medium;

first driving means for moving the medium and the light beam relative to each other in a longitudinal direction of the parallel tracks;

second driving means for relatively moving the light beam in a direction crossing the parallel tracks;

control means for controlling said second driving means for accessing the light beam to a track for effecting recording or reproduction, after a predetermined time period has elapsed subsequent to reduction of relative velocity between the light beam and the medium in the longitudinal direction of the parallel tracks to zero.

11. An apparatus according to claim 10, wherein the recording medium further comprises a tracking track adjacent to each of the plurality of parallel tracks for detecting a tracking signal, and said apparatus further comprises means for counting the number of tracking tracks crossed by said recording and/or reproducing means.

12. An apparatus according to claim 10, wherein the recording medium comprises a card-like optical information recording medium.

13. An apparatus according to claim 10, wherein said second driving means comprises an auto tracking actuator for driving an objective lens for condensing a light beam onto the recording medium and a kick circuit for supplying a drive pulse signal to said actuator.

14. An apparatus for recording and/or reproducing information comprising:

recording and/or reproducing means for recording information in and/or reproducing information from an information recording medium comprising a plurality of parallel tracks and a no-error mark recorded in a recorded information track indicating that information recorded in that track contains no error;

first driving means for moving the recording medium and said recording and/or reproducing means relative to each other in a longitudinal direction of the parallel tracks;

second driving means for moving said recording and/or reproducing means relative to the recording medium in a direction crossing the parallel tracks;

control means for controlling said first driving means for disabling said first driving means when said second driving means is operated; and means for counting the number of no-error marks crossed by said recording and/or reproducing means while relatively moving in the direction crossing the parallel tracks.

15. An apparatus according to claim 14, wherein the recording medium comprises an optical information recording medium in and/or from which information is recorded and/or reproduced upon radiation of a light beam spot.

16. An apparatus according to claim 15, wherein said recording and/or reproducing means comprises an optical head comprising a light source for emitting a light beam and an optical system for focusing the light beam emitted from said light source onto the recording medium.

17. An apparatus according to claim 15, wherein the optical information recording medium comprises a card-like medium.

18. An apparatus for recording and/or reproducing information comprising:

recording and/or reproducing means for recording information in and/or reproducing information from an information recording medium comprising a plurality of parallel information tracks for containing information and tracking tracks for providing a tracking signal, alternately arranged, and further comprising an error mark recorded in a recorded information track indicating that information recorded in that track contains error;

first driving means for moving the medium and said recording and/or reproducing means relative to each other in a longitudinal direction of the parallel tracks;

second driving means for moving said recording and/or reproducing means and the medium relative to each other in a direction crossing the parallel tracks;

control means for controlling said first driving means for disabling said first driving means when said second driving means is operated; and means for counting the number of tracking tracks and error marks crossed by said recording and/or reproducing means while relatively moving in the direction crossing the parallel tracks.

* * * * *

UNITED STATES PATENT AND TRADEMARK OFFICE
CERTIFICATE OF CORRECTION

PATENT NO. : 4,982,391
DATED : January 1, 1991
INVENTOR(S) : Wataru Sakagami, et al.

It is certified that error appears in the above-identified patent and that said Letters Patent is hereby corrected as shown below:

IN THE DISCLOSURE

COLUMN 1

Line 10, "ion/from" should read --on/from--;
Line 52, "directed" should read --direction--; and
Line 53, "LP direction)." should read --LF direction).--.

COLUMN 3

Line 51, "light/beam" should read --light beam--; and
Line 68, "card/used" should read --card used--.

COLUMN 7

Line 60, " track 5 (n+2)' " should read --track 5 - (n+2)'.--.

UNITED STATES PATENT AND TRADEMARK OFFICE
CERTIFICATE OF CORRECTION

PATENT NO. : 4,982,391
DATED : February 12, 1991
INVENTOR(S) : Wataru Sakagami, et al.

It is certified that error appears in the above-identified patent and that said Letters Patent is hereby corrected as shown below:

COLUMN 8

Line 56, "application" should read --applicant--.

COLUMN 10

Line 12, "direction," should read --direction--; and
    Line 13, "direction" should read --direction,--.

COLUMN 14

Line 9, "check" should read --check,--; and
    Line 65, "mode." should read --modes.--.

COLUMN 15

Line 12, "operations" should read --operations,--;
    Line 13, "operation" should read --operation,--;
    Line 14, "position b," should read --position e,--; and
    Line 15, "data" should read --data,--.

Signed and Sealed this

Sixteenth Day of May, 2000

Attest:

Q. TODD DICKINSON

Attesting Officer    Director of Patents and Trademarks